Nov. 14, 1961 F. H. RAYMOND 3,009,068

BINARY DATA PROCESSING DEVICES

Filed April 16, 1957 2 Sheets-Sheet 1

INVENTOR
FRANCOIS H. RAYMOND
BY Kemon, Palmer, Stewart & Estabrook
ATTORNEYS

United States Patent Office 3,009,068

Patented Nov. 14, 1961

3,009,068

BINARY DATA PROCESSING DEVICES

Francois Henri Raymond, Saint-Germain-en-Laye, France, assignor to Societe d'Electronique et d'Automatisme, Courbevoie, France Filed Apr. 16, 1957, Ser. No. 653,138
Claims priority, application France Apr. 24, 1956
9 Claims. (Cl. 307—88.5)

The present invention relates to improved binary data processing devices for effecting such elementary logical operations as AND operation, OR operation and Exclusive OR operation. Logical "AND" operation, indicates that one predetermined term of an alternative is at a definite time present in each one of a given plurality of alternatives. Logical OR operation, indicates that one predetermined term of an alternative is at a definite time present in one at least of a plurality of given alternatives. Logical Exclusive-OR operation, indicates that such a predetermined term of an alternative only exists in a single one of a given plurality of alternatives. In the following disclosure and for the sake of simplicity, only one pair of alternatives will be concerned therein but it is apparent how arrangements according to the invention may be provided and operated for handling any plurality of such alternatives once the said arrangements are known for a single pair of alternatives.

In electrical computation, the above definitions are conventionally translated as follows: any one of the concerned alternatives is given as an electrical binary data, representing either the digital value 1 or the digital value 0 according to whether an electrical signal presents the one or the other of the two conditions thereof, and for instance whether an electrical pulse is present, digital value 1, or is not present, digital value 0, at a definite time and at a definite location in the computer circuits, or whether an electrical voltage is of a higher value, digital value 1, or a lower value, digital value 0, at such definite time and location therein. A positive AND operation condition will be met when all the electrical data of a given plurality will each be of their digital values 1. A positive OR operation condition will exist when one at least of such electrical data is of the digital value 1 thereof. An effective "Exclusive-OR" operation condition will exist when only one of such electrical data has the digital value 1. Of course, such conditions are taken with reference to a definite time instant and a definite location of the operation and structure of the concerned computer.

Electroluminescent devices are presently known which comprise a thin semi-dielectric layer of electroluminescent material between a pair of conductive electrodes or armatures one of which at least is translucent. The electroluminescent material thereof may be made of a composition of oxides and/or sulphides, such as for instance a composition of zinc and copper oxides obtained from an alloy of pure metallic zinc and pure metallic copper containing less than .8% of copper, by an operation of electrostatic transfer of the particles of such an alloy within an atmosphere of oxygen onto a conducting surface which acts as an anode for such transfer when a suitable potential difference is applied across the alloy layer and the said conducting surface arranged face to face in close proximity. The conductive electrodes may consist of metallic films, one of which, for instance the one which constitutes the said conducting surface for the said transfer operation, is rhodium coated, the other one being for instance made of an evaporated aluminium or silver film on the other face of the electroluminescent layer of the device. During the above-said transfer operation, it is preferred to apply heat to the conducting surfaces which receive the electroluminescent material particles so that the material is obtained as a monocrystalline layer thereon.

In such devices the activation of electroluminescence is obtained, as known, from the application of an A.C. voltage across the electrodes thereof, and the electroluminescence disappears as soon as this voltage is suppressed.

Photoelectric cells are also known which do not present any substantial inertia or time lag of response and are devoid of any substantial electrical rectifying effect. Such cells are for instance made of a thin layer of such a photoresponsive material as pure silicon between a pair of electrodes one of which at least is translucent. Such a thin layer of pure silicon may for instance be obtained by a pyrolitic conversion process of vapours of silicon tetrachloride carried within a flux of hydrogen onto a heat-resisting conductive film previously formed over a surface which is suitably heated during such conversion process. Such a film may for instance comprise a composition of metallic oxides of high conductivity. A composition of niobium and thorium oxides is quite suitable in this respect and may be obtained from a pyrolitic conversion process applied to a homogeneous mixture of niobium pentabromide and thorium tetrabromide carried in a flux of oxygen onto a heated dielectric surface. The other electrode of the cell may be made by any suitable process as a translucent film thereon, for instance in the same manner as for the first mentioned of the said electrodes.

In such a cell, the photoelectric effect is only produced in the presence of light when a potential difference is applied across the electrodes thereof.

Predetermined configurations may be obtained for each and any of the electrodes in the said electroluminescent and photoelectric devices. For any simple electrode consisting of a film of a metal, any technique of the so-called "printing" kind, for instance the photo-etching process, may be applied to the film in order to obtain the required configuration. Considering the above-mentioned rhodiated electrode, such an electrode may be obtained as a network of conducting lines by first applying by silk-screen printing onto a base plate a deposit consisting of a mixture of powdered gold or silver and low-melting point enamel, then heating the deposit until the aromatic carbides of the essential oil, of clove or camomile, included therein, are evaporated, and thereafter applying a rhodium deposit thereupon from a galvanoplastic process. Considering an electrode made of a composition of oxides, the base plate may be coated, prior to the pyrolitic conversion of the said composition thereon, with a mask consistiing in a viscous solution of a mixture containing by weight 50% of finely powdered silica, 26% of aluminium in powdered form, 11% of potassium oxide, 4% of sodium oxide and 1% of sodium borate, within a mixture comprising by weight 73% of sodium sulfosuccinate, 12% of methanol, 5% of glycerin and 10% of carboxymethylcellulose. Such a mask and the oxide coating thereof will be removed with chlorhydric acid which does not affect the oxide composition proper.

It may be also stated that information retaining or storage members may be obtained by the establishment, between a pair of conducting electrodes one of which at least is translucent for the reception thereon of an information bearing light, of a complex comprising a layer of electroluminescent material and a photoresponsive layer, both layers being of the above-defined structures and properties. In such a storage member, an impinging light will produce the activation of electroluminescence when a suitable potential difference is applied across the said electrodes and the said activation will last until the said potential difference is removed therefrom.

In accordance with the invention, a data processing device for processing binary data in the form of voltage waveforms having one or the other of two amplitude levels comprises an electroluminescent member having at least one pair of electrodes on opposite sides of the electroluminescent layer, one of said electrodes being translucent and each having a separate input terminal for the application thereto of separate input data signals, and a photoelectric member optically related to said electroluminescent member and having at least one pair of electrodes on opposite sides of a photoresponsive layer, one of the latter pair of electrodes also being translucent and each having a terminal connected thereto, one such terminal serving for the application of a control voltage to its associated electrode and the other such terminal serving as an output terminal.

In the following disclosure, the electroluminescent cell will be said to be the "logical" member of the device according to the operativeness thereof, and the photoresponsive cell will be said to be the "reading" member thereof although in some cases as it will be hereinbelow detailed, it will equally act as a part of the logical processing device as a whole.

In the main part of the following description, the input binary coded signals will be considered as being of the so-called "serial" kind, the digits thereof entering at different time instants in the device. It will however be explained in detail how such a device may also and without any change therein handle coded signals of the so-called "parallel" kind, wherein in each coded signals, all the digits arrive at the same instant but on separate input channels.

For a practical understanding of the invention, further, it must be remembered that, in a digital computation system, any binary data handled therein may be available either in the "plain" or normal representation, as herein above defined, or in a "complementary" representation thereof wherein any digital value 1 is represented by the condition representing the digital value 0 in the plan representation, and conversely. According to a conventional fashion of writing binary data, the plain representation of such a data will be expressed by a simple letter or symbol and the complementary representation of the same data will be expressed by the same letter or symbol with a bar over it. For instance a binary data $(a)$ will be expressed by "$a$" in the plain representation thereof and by $\bar{a}$ in the complementary representation thereof.

Complementation is the logical operation which enables the passage from a plain representation of a data to the complementary representation thereof. As it will be apparent such a complementation operation is a certain kind of AND operation wherein one of the data always presents the value 1 for each bit thereof.

The invention will be further described with reference to the accompanying drawings, wherein.

Figures 1, 2:
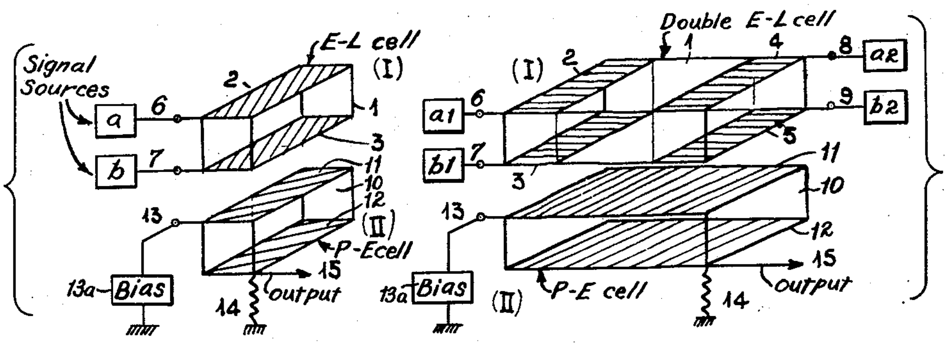
FIG. 1 shows a first arrangement of an elementary processing device according to the invention, enabling the quite elementary logical operations of "On-operation" and "And-operation"
FIG. 2 shows a further embodiment of an elementary processing device according to the invention enabling further simple logical operations such as Exclusive-Or operation, Or-operation, or And-operation.

In FIGS. 1 and 2, the logical member is shown at I and the reading-out member is shown at II. It must be understood that the optical connection between these members has not been actually shown as these members may preferably be arranged on either sides of a mere translucent dielectric plate in order to obtain a unitary or self-contained unit. However, a projecting and focussing optique may be used if required between the members.

An information storage member such as herein above defined may be inserted, if required, between the members I and II. This will be used when the reading-out is required with a certain amount of delay with respect to the input, or with a duration longer than that defined by the durations of the input signal bits. Obviously a self-contained unit may also be provided in such a case.

Referring to FIG. 1, the electroluminescent monocrystal 1 is inserted between two electrodes 2 and 3, each one shown as a portion of a linear conductive surface. The electrode 2 is connected to an input terminal 6, the electrode 3, to an input terminal 7.

Referring to FIG. 2, the said electroluminescent monocrystal 1 is inserted between two pairs of electrodes 2—4 and 3—5, which are respectively connected to input terminals 6—8 and 7—9.

In both FIGS. 1 and 2, the photoelectric layer 10 of the reading-out member is provided with a pair of armatures or electrodes 11 and 12. The electrode 11 is connected to a control terminal 13, the electrode 12 is for instance connected to the ground through a resistor 14. The output is taken across the said resistance 14 over the output conductor 15. In FIG. 1, the areas of the electrodes 11 and 12 of the photoelectric layer 10 are equal to the area of the electrodes 2 and 3 of the logical member. In FIG. 2, the areas of the said electrodes 11 and 12 are such that they cover both the areas of the electrodes 2—4 and 3—5 and the interval between such areas in the logical member I.

Obviously, in the drawing, all thicknesses are exaggerated for clarity of representation of the elements thereof, as well as the areas of the said elements.

An electroluminescent crystal can only be activated when the value of the potential difference across the electrodes thereof is higher than a predetermined threshold value, depending upon the kind of electroluminescent material used and the dimensional charatceristics of the crystal. For instance, it may be herein considered that the activation threshold of the crystal of the FIGS. 1 and 2 is between 70 and 80 volts.

It will be considered that, when no signal is present upon a terminal of the member I of the device, said terminal has ground potential, viz. zero.

Figure 3:
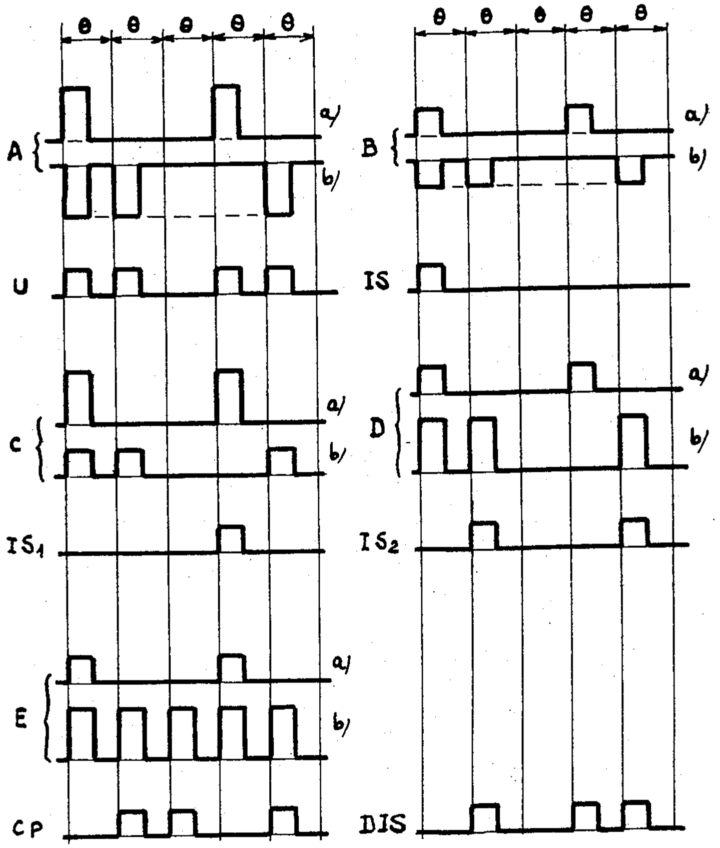
FIG. 3 shows various graphs of signals for the operation of the devices of FIGS. 1 and 2.

Referring both to FIG. 1 and to the pair of waveforms of FIG. 3 shown at (A), each one of the signals $(a)$ and $(b)$ of the said pair of graphs is a rectangular wave-form one of which varies from 0 to +100 volts and the other one varies from 0 to −100 volts. In such a condition, it is quite apparent that the electroluminescence of the crystal will be activated each time either one or the other of the said signals is at the higher voltage value thereof, and of course when both the said signals are respectively at their higher voltage values, i.e. plus or minus 100 volts for the said respective signals $a$ and $b$. The waveform $(a)$ is applied to terminal 6 and the waveform $(b)$, to terminal 7. Both waveforms have a pulse period $\theta$, and an identical phase.

When, during the time interval these waveforms are applied to the logical member I, a bias voltage from source 13*a* is applied at 13 to the reading-out member II, an electrical signal U will appear at the output 15 of the device which will represent the union of the binary codes $a$ and $b$, as a result of the unrestricted OR operation, viz. a signal $a+b$.

If, on the other hand, in waveforms B in FIG. 3, each one of the signal waveforms $a$ and $b$ only varies by 50 volts, in opposite relative directions, the electroluminescence will only be activated when the amplitudes or levels of both the said waveforms are of their higher values. Consequently the signal IS issuing at 15 will represent the result of the AND operation, $a.b$, between the said signals $a$ and $b$.

When, in waveforms C on FIG. 3, the waveform $(a)$ varies between 0 and +100 volts and the waveform $(b)$, between 0 and +50 volts, the crystal will only be activated when a higher level of the waveform $(a)$ does not coexist with a higher level of the waveform $(b)$ because the voltage difference across the electrodes of the said crystal will only be equal to 50 volts, lower than the threshold when both the waveforms $(a)$ and $(b)$ are at their respective higher levels. The output signal consists of the waveform shown at $IS_1$ in FIG. 3 and represents the logical product $a.\bar{b}$. A reversal of those amplitude relations between the input waveforms $(a)$ and $(b)$, waveforms D of FIG. 3 will give an output signal representing the logical product $\bar{a}.b.$ as shown at $IS_2$ in the said FIG. 3.

When the waveform $(b)$ is always at the higher level thereof at each pulse period $\theta$, waveform E of FIG. 3, the output signal will represent the signal $CP\bar{a}$ complementary of the input signal $a$, waveform CP of the said FIG. 3.

Arranging the device of FIG. 1 according to FIG. 2 makes it possible to effect any one of the preceding operations for each pair of signals applied to the terminals 6—8 or 8—9. With such an arrangement, the reading-out member also provides, when necessary, an additional OR operation between the results of operation of the logical member I proper. Henceforth, such an arrangement constitutes a processing device which, in addition to a single AND or OR operation of two signals, provides, when necessary, for an OR operation of four signals, an OR operation of two AND operation results, an OR operation of the complements of two signals, and an Exclusive OR operation or between a pair of input variables available in both their plain and complementary waveforms. This Exclusive OR operation is obtained when for instance the waveform $(a)$ of the graph C of FIG. 3 is applied to the input terminal 6, the waveform $(b)$ of the same graph C, to the input terminal 7, the waveform $(a)$ of graph D of FIG. 3, to the input terminal 8 and the waveform $(b)$ of the same graph D, to the input terminal 9. Then, the output signal DIS represents the result of the logical operation $a.\bar{b}+\bar{a}.b$, viz., an Exclusive OR operation since the signal DIS is the AND result of the signals IS1 and IS2, each element of signal DIS appearing only when one of the input variables $a$ and $b$ has the digital value 1 whereas the other one has the digital value 0, and vice-versa.

Another way of considering the derivation of the arrangement of FIG. 2 from the arrangement of FIG. 1 is to divide the electrodes 11 and 12 of the reading-out member of FIG. 1 so that each pair of electrodes of the logical member 2—3 and 4—5 of the said logical member cooperates with one part of the divided pair of electrodes 11 and 12. Each pair of the divided electrodes of the reading-out member will be provided with an individual output connection and the operations such as disjunction or other operations comprising an union at the reading-out level of two terms each one representing the result of an elementary logical operation from the logical member will be made from an electrical interconnection of the individual output leads from the reading-out member. Such an alternative embodiment in effect, comprises a pair of devices according to FIG. 1 having common electroluminescent and photoelectric layers.

The extension of the preceding disclosure to processing devices for simultaneously handling a plurality of input coded signals is readily apparent since it merely comprises the combination of a number of such devices as in FIGS. 1 and/or 2, in a composite structure which is preferably made as a self-contained unit by the use of a single wide area electroluminescent layer and a single wide area photoelectric layer therein upon which are formed the required pluralities of conductive armatures or electrodes therefor with their respective input, control and output terminals as said.

Figure 5:
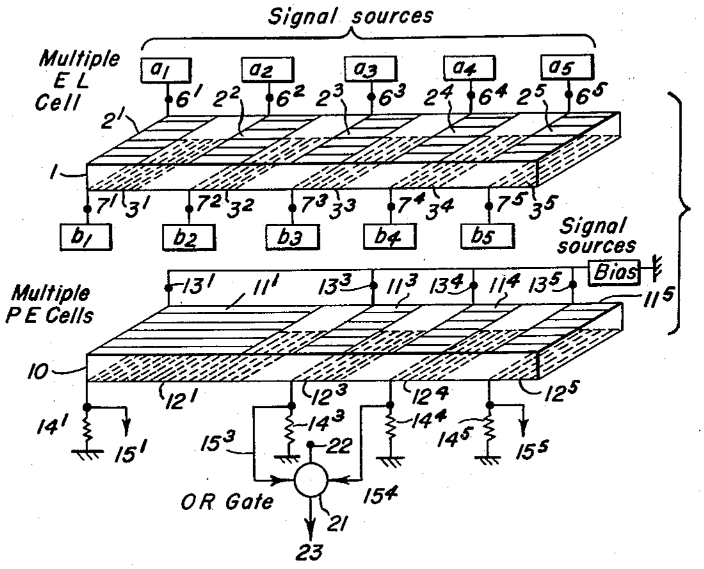
FIG. 5 shows an illustrative arrangement of a plurality of elementary devices according to the invention, for better defining the use thereof in data processing apparatus.

FIG. 5 illustrates such a multiple arrangement, a layer 1 of electroluminescent material is provided with five pairs of electrodes $2^1$—$3^1$ to $2^5$—$3^5$; each electrode is provided with a separate input for application thereto of a distinct binary coded signal.

Under this member, a photoconductive member comprises a similarly made layer 10 of photoconductive material provided with four pairs of electrodes, the pair $11^1$—$12^1$ of which registers with both the pairs of electrodes $2^1$—$3^1$ and $2^2$—$3^2$ of the logical member, and each one of the pairs of electrodes $11^3$—$12^3$ to $11^5$—$12^5$ registers with each one of the pairs of electrodes $2^3$—$3^3$ to $2^5$—$3^5$ of the said first electroluminescent member.

Outputs 15 are provided for the separate electrodes 12 of the photoconductive member. Further, the outputs from $12^3$ and $12^4$ are brought to a gate 21 which, when controlled by the control input 22 thereof to be operative, will pass to the output 23 of the said gate 21 a signal resulting in a union of the signals issuing from the corresponding members of the elementary devices having electrodes $12^3$ and $12^4$ as output electrodes thereof. Of course, different combinations may be provided when required in the outputs of the shown cells.

At the output $15^1$ will appear the disjunction signal between the combinations of signals ensured by the pairs of electrodes $2^1$—$3^1$ and $2^2$—$3^2$.

It should be noted that when an intermediate "memory" member is used, there is no need to provide such a member with divided armatures or electrodes as it merely acts as a multiple relaying element of all luminescent spots created within the logical composite member in their optical transmission to the outputs of the said reading-out composite member.

Figure 4:
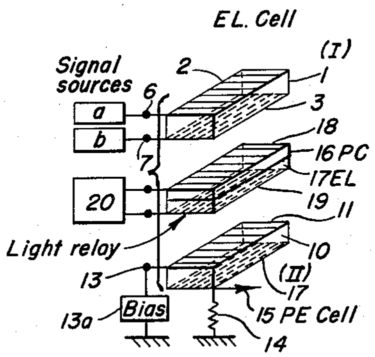
FIG. 4 shows an alternative embodiment of FIG. 1.

Referring to FIG. 4, an information storage member is shown between the logical member (I) and the reading-out member (II), comprising, as hereinbefore defined, a sandwich of an electroluminescent slab 17 coated with a photoconductive layer 16 between a pair of conductive translucent electrodes 18 and 19 across which is applied a potential difference from a voltage source 20 for sustaining, when required, the luminescence of the said member when it has been activated by a temporary light from the member (I).

A device according to the invention having a plurality of pairs of electrodes will enable the handling of parallel codes in an apparent way: each signal comprises a definite plurality of electrical bits all arriving with the same timing onto different pairs of electrodes of the device and in phase with the other parallel code signal to be combined therewith. The digits of the result of the logical operation effected by such a combination of electrical parallel codes are at the same time instant available at the various corresponding output terminals of the subdivided reading-out device.

It is quite apparent from the above that the nature of operation carried on within the device depends on a previous calibration or selection of the composition of the incoming signals applied thereto, both in level and polarity. When such a data processing device is inserted in a computer, this will not involve special problems as, in such computers, each logical operation or set of logical operations to be made is represented by what is commonly called a "function" symbol or letter in the program instructions of the computer. Each instruction being in turn analysed and decoded, the decoding voltage from the said function symbols will both select the binary codes of the numbers to be operated upon and control their polarities and amplitude levels required for the thus-identified logical operation. For instance and referring to the above described examples of operation, the computer will have instructions including such function symbols as: OR operation, AND operation, complementation, Exclusive-OR, and so forth.

What is claimed is:

1. A binary data electrical processing device which comprises in combination a first layer of electroluminescent material and a second layer of photoresponsive material optically related to said first layer so that any light spot activated in the first layer is collected at a corresponding location in the second layer, each layer having at least one pair of opposed electrodes arranged on opposite faces thereof, one electrode of each layer being translucent, a plurality of sources of binary data signals, each source providing a train of electrical pulses having predetermined characteristics of amplitude and polarity, the pulses of at least one train having at least one characteristic which is different from that of another train, means connecting each of said sources to a respective electrode of the luminescent layer, such that pulses on opposed electrodes differ in at least one characteristic, said luminescent layer being activatable in response to a predetermined minimum amplitude difference of the pulses on opposed electrodes, a source of control voltage connected to one electrode of an opposed pair of electrodes on the photorespnsive layer and means connected to the other electrode of said opposed pair to provide an output signal generated by the activation of the photoresponsive layer in response to activation of the electroluminescent layer by the pulses applied to the electrodes thereof.

2. A binary data processing device in accordance with claim 1 in which the electroluminescent layer is provided with two pairs of opposed electrodes, the electrodes of each pair being spaced from those of the other pair, the electrodes of the photoresponsive layer covering an area which is coextensive with both areas of said two pairs of electrodes.

3. A binary data processing device in accordance with claim 1 in which both said layers are provided with a plurality of pairs of opposed electrodes, the pairs of electrodes being spaced from each other, the pairs of electrodes of one layer being optically cooperative with those of the other layer.

4. A binary data processing device in accordance with claim 1 in which both said layers are provided with a plurality of pairs of opposed electrodes, the pairs of electrodes being spaced from each other, some of the corresponding pairs of electrodes of both layers being in optical relation with each other.

5. A binary data processing device in accordance with claim 1 in which both said layers are provided with a plurality of pairs of opposed electrodes, the pairs of electrodes being spaced from each other, some of the corresponding pairs of electrodes of both layers being in optical relation with each other, and means for combining the signal outputs from at least two said other electrodes of the photoresponsive layer.

6. A binary data processing device in accordance with claim 1 in which both said layers are provided with a plurality of pairs of opposed electrodes, the pairs of electrodes being spaced from each other, some of the corresponding pairs of electrodes of both layers being in optical relation with each other, and a pair of opposed electrodes of the photosensitive layer being in optical relation with at least two pairs of opposed electrodes on the electroluminescent layer.

7. A binary data processing device in accordance with claim 1 in which both said layers are provided with a plurality of pairs of opposed electrodes, the pairs of electrodes being spaced from each other, some of the corresponding pairs of electrodes of both layers being in optical relation with each other, a pair of opposed electrodes of the photosensitive layer being in optical relation with at least two pairs of opposed electrodes on the electroluminescent layer, and means for combining the signal outputs from at least two of the other electrodes of the photoresponsive layer.

8. A binary data electrical processing device in accordance with claim 1 including a light relay interposed between the said two layers and responsive to a light pulse from the first layer for transmitting a light pulse to the second layer.

9. A binary data electrical processing device in accordance with claim 1 including a light relay interposed between the said two layers, said relay comprising at least one electroluminescent layer and one photoresponsive layer in juxtaposed relation, a translucent electrode on the outer surface of each layer and means for applying a potential difference between said electrodes to render it operative upon reception of a light pulse from the first layer to produce a light pulse for transmission to the second layer.

References Cited in the file of this patent

UNITED STATES PATENTS 2,903,602 Fleisher ---------------- Sept. 8, 1959

FOREIGN PATENTS 157,101 Australia ---------------- June 16, 1954

OTHER REFERENCES

"Optical Storage Cells and Switches," Quarterly Report #3, Mellon Institute of Industrial Research Computer Components Fellowship No. 347, "Electro-Optical Transducers or Switches," Quarterly Report #3, Second Series, Mellon Institute of Industrial Research, Computer Components Fellowship No. 347, January 1, 1955–March 31, 1955.

UNITED STATES PATENT OFFICE
CERTIFICATION OF CORRECTION

Patent No. 3,009,068 November 14, 1961

Francois Henri Raymond

It is hereby certified that error appears in the above numbered patent requiring correction and that the said Letters Patent should read as corrected below.

Column 2, line 50, for "consistiing" read -- consisting --; column 3, line 38, for "plan" read -- plain --; line 57, for '"On-operation"' read -- "Or-operation" --; column 4, line 28, f "area" read -- areas --.

Signed and sealed this 24th day of April 1962.

(SEAL)
Attest:

ESTON G. JOHNSON
Attesting Officer

DAVID L. LADD
Commissioner of Patents